(12) United States Patent
Cvelbar et al.

(10) Patent No.: US 11,585,255 B2
(45) Date of Patent: Feb. 21, 2023

(54) CROWNED INLET BAFFLE FOR HIGH EFFICIENCY MIXER

(71) Applicant: Faurecia Emissions Control Technologies, USA, LLC, Columbus, IN (US)

(72) Inventors: Randall Cvelbar, Columbus, IN (US); Eduardo Alano, Columbus, IN (US); Amaresh Rakkasagi, Bengaluru (IN); Jerome Hornback, Indianapolis, IN (US); Jeffery Prairie, Franklin, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 64 days.

(21) Appl. No.: 17/101,261

(22) Filed: Nov. 23, 2020

(65) Prior Publication Data

US 2022/0162975 A1    May 26, 2022

(51) Int. Cl.
*F01N 3/28* (2006.01)
*F01N 3/20* (2006.01)
(Continued)

(52) U.S. Cl.
CPC ....... *F01N 3/2892* (2013.01); *B01D 53/9431* (2013.01); *B01F 23/2132* (2022.01);
(Continued)

(58) Field of Classification Search
CPC .... F01N 3/2892; F01N 3/2066; F01N 13/008; F01N 2610/02; F01N 2610/1453;
(Continued)

(56) References Cited

U.S. PATENT DOCUMENTS 10,100,700 B2   10/2018  Zhang et al.
10,215,076 B2 *  2/2019  Solipuram .......... F01N 13/1872
(Continued)

FOREIGN PATENT DOCUMENTS

CN    106523092 A  *  3/2017  .......... F01N 3/2066
CN    109184865 A     1/2019

*Primary Examiner* — Devon C Kramer
*Assistant Examiner* — Kelsey L Stanek
(74) *Attorney, Agent, or Firm* — Carlson, Gaskey & Olds, P.C.

(57) ABSTRACT

A mixer assembly for a vehicle exhaust system includes a mixer shell defining an internal cavity, wherein the mixer shell includes an upstream end configured to receive exhaust gases and downstream end, and a reactor positioned within the internal cavity. The reactor has a reactor inlet configured to receive injected fluid and a reactor outlet that directs a mixture of exhaust gas and injected fluid into the internal cavity. An inlet baffle is mounted to the upstream end of the mixer shell. The inlet baffle includes at least one opening that directs exhaust gas into at least one exhaust gas inlet to the reactor and a plurality of bypass openings that direct exhaust gas to bypass entry into the reactor. The inlet baffle includes a crowned portion that curves away from the reactor to provide for an increased open area within the internal cavity between the inlet baffle and the reactor.

23 Claims, 4 Drawing Sheets

(51) Int. Cl.
*F01N 13/00* (2010.01)
*B01D 53/94* (2006.01)
*B01F 23/213* (2022.01)
*B01F 25/313* (2022.01)
*B01F 25/421* (2022.01)

(52) U.S. Cl.
CPC ...... *B01F 25/3131* (2022.01); *B01F 25/4231* (2022.01); *F01N 3/2066* (2013.01); *F01N 13/008* (2013.01); *F01N 2610/02* (2013.01); *F01N 2610/1453* (2013.01)

(58) Field of Classification Search
CPC ........... F01N 2560/026; F01N 2560/06; B01F 25/3131; B01F 25/4231; B01F 23/2132; B01D 53/9431
USPC .................................. 60/324, 326; 422/119
See application file for complete search history.

(56) References Cited

U.S. PATENT DOCUMENTS

| | | | |
|---|---|---|---|
| 10,533,478 B2 | 1/2020 | Alano | |
| 2019/0388848 A1 | 12/2019 | Kurpejovic et al. | |
| 2020/0032692 A1* | 1/2020 | Wang | F01N 3/2892 |
| 2020/0217232 A1 | 7/2020 | Kurpejovic et al. | |
| 2020/0269189 A1* | 8/2020 | Alano | F01N 3/2066 |
| 2021/0095587 A1* | 4/2021 | Cvelbar | F01N 3/2066 |
| 2021/0301710 A1* | 9/2021 | Cvelbar | B01F 23/2132 |
| 2021/0388751 A1* | 12/2021 | Cvelbar | F01N 13/008 |

* cited by examiner

CROWNED INLET BAFFLE FOR HIGH EFFICIENCY MIXER

TECHNICAL FIELD

This disclosure relates generally to an exemplary compact mixer configuration that includes a crowned inlet baffle to maintain a high mixing performance with improved durability.

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. The injection system includes a doser that sprays the fluid into an exhaust gas stream. A mixer is positioned upstream of the SCR catalyst to mix engine exhaust gases with the injected fluid. It is challenging to configure the plurality of exhaust system components within available packaging space. Compact mixer configurations have shorter overall lengths to allow for more efficient packaging but need to maintain high mixing performance while also meeting durability requirements to accommodate for vehicle and road vibrations.

SUMMARY

A mixer assembly according to an exemplary aspect of the present disclosure includes, among other things, a mixer shell defining an internal cavity, wherein the mixer shell includes an upstream end configured to receive exhaust gases and downstream end, and a reactor positioned within the internal cavity. The reactor has a reactor inlet configured to receive injected fluid and a reactor outlet that directs a mixture of exhaust gas and injected fluid into the internal cavity. An inlet baffle is mounted to the upstream end of the mixer shell. The inlet baffle includes at least one opening that directs exhaust gas into at least one exhaust gas inlet to the reactor and a plurality of bypass openings that direct exhaust gas to bypass entry into the reactor. The inlet baffle includes a crowned portion that curves away from the reactor to provide for an increased open area within the internal cavity between the inlet baffle and the reactor.

In a further non-limiting embodiment of the foregoing assembly, the mixer shell defines a mixer center axis, and wherein the at least one opening is positioned on one side of the center axis and the crowned portion is positioned on an opposite side of the center axis.

In a further non-limiting embodiment of any of the foregoing assemblies, the inlet baffle includes a flange formed about a periphery of the inlet baffle, the flange comprising an attachment interface to the mixer shell, and wherein the crowned portion comprises a curved surface that curves from a base of the flange at one peripheral location on the inlet baffle to the base of the flange at an opposite peripheral location on the inlet baffle.

In a further non-limiting embodiment of any of the foregoing assemblies, an embossment is formed within a portion of the crowned portion, the embossment protruding outwardly and away from an upstream surface of the crowned portion to further increase the open area within the internal cavity between the inlet baffle at the embossment and the reactor.

In a further non-limiting embodiment of any of the foregoing assemblies, the mixer shell defines a mixer center axis, and wherein the embossment comprises a C-shape that is defined by a radially outward edge and a radially inward edge that are connected by opposing side edges.

In a further non-limiting embodiment of any of the foregoing assemblies, at least some of the plurality of bypass openings are formed within the embossment.

In a further non-limiting embodiment of any of the foregoing assemblies, the inlet baffle comprises a first portion that includes the at least one opening, a second portion that includes the plurality of bypass openings, and a third portion that includes at least one sensor mount area, and wherein the third portion separates the first and second portions from each other, and wherein the crowned portion is formed within the second portion.

In a further non-limiting embodiment of any of the foregoing assemblies, the sensor mount area comprises at least first and second indentations that are each configured to receive a sensor, wherein the indentations extend in a downstream direction.

In a further non-limiting embodiment of any of the foregoing assemblies, the first and second indentations are connected to each other with a rib.

In a further non-limiting embodiment of any of the foregoing assemblies, an embossment is formed within the crowned portion, the embossment protruding outwardly and away from an upstream surface of the crowned portion to further increase the open area within the internal cavity between the inlet baffle at the embossment and the reactor.

In a further non-limiting embodiment of any of the foregoing assemblies, the mixer shell defines a mixer center axis, and wherein the inlet baffle includes a solid surface portion free from the plurality of bypass openings, and wherein the solid surface portion is positioned radially between the embossment and the first and second indentations.

In a further non-limiting embodiment of any of the foregoing assemblies, the embossment comprises a C-shape that extends partially about the mixer center axis.

In a further non-limiting embodiment of any of the foregoing assemblies, an outlet baffle is mounted to the downstream end of the mixer shell, the outlet baffle including a plurality of mixer outlet openings.

An assembly, according to yet another exemplary aspect of the present disclosure includes, among other things, a mixer shell having a mixer center axis and defining an internal cavity, wherein the mixer shell includes an upstream end configured to receive exhaust gases and downstream end, and wherein the mixer shell includes a doser opening configured to receive a doser that injects fluid. A reactor is positioned within the internal cavity. The reactor has a reactor inlet that is aligned with the doser opening to receive injected fluid, at least one exhaust gas inlet to direct exhaust gas into the reactor, and a reactor outlet that directs a mixture of exhaust gas and fluid into the internal cavity. An inlet baffle is mounted to the upstream end of the mixer shell, wherein the inlet baffle includes at least one opening that directs exhaust gas into the at least one exhaust gas inlet to the reactor and a plurality of bypass openings that direct exhaust gas to bypass entry into the reactor. The inlet baffle includes a crowned portion that curves away from the reactor to provide for an increased open area within the internal cavity between the inlet baffle and the reactor. An outlet baffle is mounted to the downstream end of the mixer shell, the outlet baffle including a plurality of mixer outlet openings.

In a further non-limiting embodiment of any of the foregoing assemblies, the inlet baffle comprises a first portion that includes the at least one opening, a second portion that includes the plurality of bypass openings, and a third portion that includes at least one sensor mount area, and wherein the third portion separates the first and second portions from each other, and wherein the crowned portion is formed within the second portion.

In a further non-limiting embodiment of any of the foregoing assemblies, the sensor mount area comprises at least first and second indentations that are each configured to receive a sensor, wherein the indentations extend in a downstream direction.

In a further non-limiting embodiment of any of the foregoing assemblies, the first and second indentations are connected to each other with a rib, and wherein the rib includes an additional indentation.

In a further non-limiting embodiment of any of the foregoing assemblies, an embossment is formed within the crowned portion, the embossment protruding outwardly and away from an upstream surface of the crowned portion to further increase the open area within the internal cavity between the inlet baffle at the embossment and the reactor.

In a further non-limiting embodiment of any of the foregoing assemblies, the inlet baffle includes a solid surface portion free from the plurality of bypass openings, and wherein the solid surface portion is positioned radially between the embossment and the first and second indentations.

In a further non-limiting embodiment of any of the foregoing assemblies, the embossment comprises a C-shape that is defined by a radially outward edge and a radially inward edge that are connected by opposing side edges.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

This disclosure details an exemplary mixer that achieves high mixing performance in a compact mixer configuration by using a flow diverter to redirect by-pass flow that has warmed up a reactor mixing chamber in order to mix with flow exiting the mixing chamber prior to reaching an exhaust after-treatment catalyst.

Figure 1:
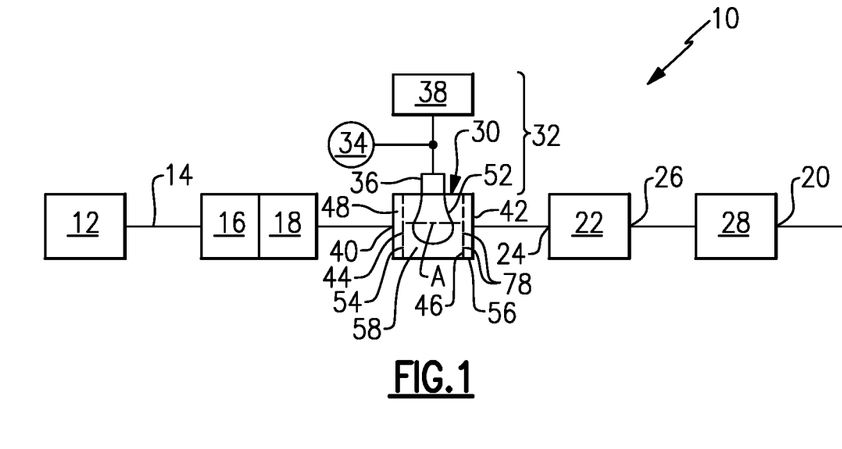
FIG. 1 schematically illustrates one example of an exhaust system according to the subject disclosure.

FIG. 1 shows a vehicle exhaust system 10 that conducts hot exhaust gases generated by an engine 12 through various exhaust components to reduce emission and control noise as known. In one example configuration, at least one pipe 14 directs engine exhaust gases exiting an exhaust manifold of the engine 12 into one or more exhaust gas aftertreatment components. In one example, the exhaust gas aftertreatment components include a diesel oxidation catalyst (DOC) 16, and an optional diesel particulate filter (DPF) 18 that is used to remove contaminants from the exhaust gas as known.

Downstream of the DOC 16 and optional DPF 18 is a selective catalytic reduction (SCR) catalyst 22 having an inlet 24 and an outlet 26. Optionally, component 22 can comprise a catalyst that is configured to perform a selective catalytic reduction function and a particulate filter function. The outlet 26 from the SCR 22 communicates exhaust gases to downstream exhaust components 28 and the exhaust gas eventually exits to atmosphere via a tailpipe 20. The various downstream exhaust components 28 can include one or more of the following: pipes, filters, valves, catalysts, mufflers etc. These exhaust system components can be mounted in various different configurations and combinations dependent upon vehicle application and available packaging space.

In one example, a mixer 30 is positioned downstream from an outlet of the DOC 16 or DPF 18 and upstream of the inlet 24 of the SCR 22. The DOC/DPF and SCR can be in-line or in parallel, for example. The mixer 30 is used to facilitate mixing of the exhaust gas.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. The injection system 32 includes a fluid supply tank 34, a doser 36, and a controller 38 that controls injection of the fluid as known. In one example, the doser 36 injects the DEF into the mixer 30 as shown in FIG. 1.

A control system includes the controller 38 that controls injection of the DEF based on one or more of exhaust gas temperature, backpressure, time, etc. The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing software, particularly software stored in memory.

Figure 2:
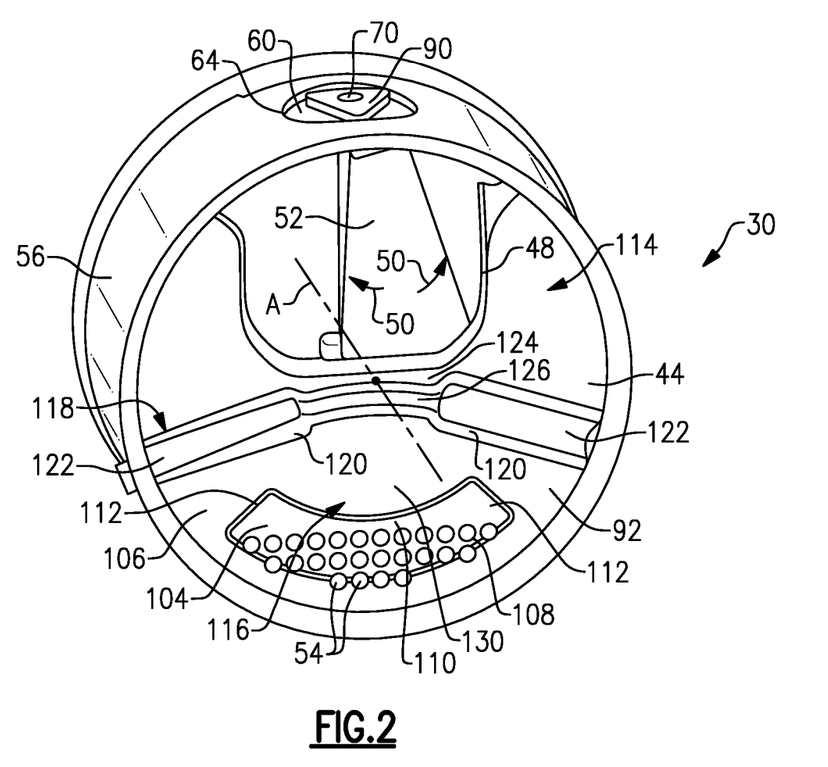
FIG. 2 is a perspective view of a mixer with an inlet reactor and inlet baffle as used in the exhaust system of FIG. 1.

The mixer 30 is used to generate a swirling or rotary motion of the exhaust gas. The mixer 30 has an inlet end 40 configured to receive the engine exhaust gases and an outlet end 42 to direct a mixture of swirling engine exhaust gas and products transformed from the injected fluid to the SCR catalyst 22. FIG. 2 shows an example of the mixer 30. The mixer 30 includes an inlet baffle 44 at the inlet end 40. An outlet baffle 46 (FIG. 1) is associated with the outlet end 42. As shown in FIG. 2, the inlet baffle 44 includes at least one large inlet opening 48 that receives the majority of the exhaust gas and directs the exhaust gas into exhaust gas inlets 50 to an inlet reactor 52. The inlet baffle 44 also includes a plurality of perforations, slots, or additional inlet openings 54 that allow the remaining exhaust gas to bypass the inlet reactor 52 to facilitate optimal homogenization of exhaust gases and reduced back pressure.

The inlet 44 and outlet 46 baffles are fixed to a mixer shell 56 that defines a mixer center axis A and provides an internal cavity 58 (FIG. 1) between the inlet 44 and outlet 46 baffles. The inlet reactor 52 is located within the internal cavity 58. In one example, the baffles comprise stamped sheet metal parts. In order to keep the compact mixer as short as possible for packaging concerns, the inlet baffle 44 is placed as close to the reactor 52 as possible. Exhaust gas and injected fluid spray, which is injected via the doser 36 into the inlet reactor 52, are mixed within the inlet reactor 52 and exit into the internal cavity 58 to mix with the bypass exhaust gas before exiting the mixer 30.

Figure 3:
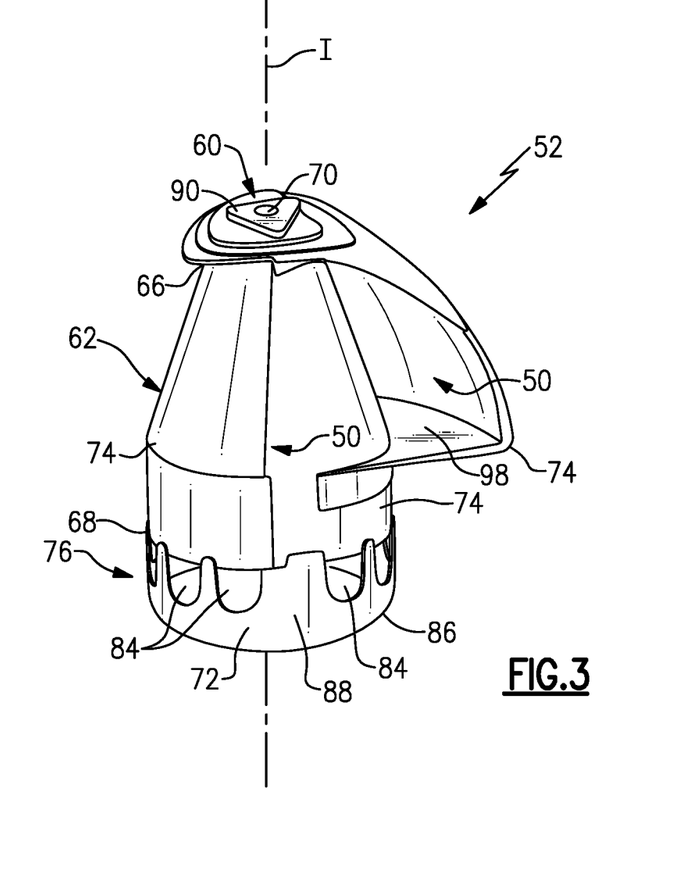
FIG. 3 is a schematic representation of the inlet reactor of FIG. 2.

In one example, the inlet reactor 52 is used to facilitate mounting the doser 36 relative to the mixer shell 56. As shown in FIG. 3, the inlet reactor 52 includes a doser mount portion 60 and a swirl chamber 62 that extends into the internal cavity 58. The doser mount portion 60 is mounted to the mixer shell 56 at a doser opening 64 (FIG. 2) formed within the mixer shell 56. The doser mount portion 60 is configured to support the doser 36 that injects a fluid into the swirl chamber 62 via a reactor inlet 70 that is aligned with the doser opening 64.

In one example, the swirl chamber 62 has a first end 66 at the doser opening 64 and a second end 68 at an outlet. In one example, the swirl chamber 62 is comprised of a plurality of flow elements 74 that are attached to each other to form an open internal area within the swirl chamber 62.

In one example, the inlet reactor 52 has the fluid inlet 70 and one or more exhaust gas inlets 50 (FIG. 3). The fluid inlet 70 is aligned with the doser opening 64 and defines an injection axis I that is transverse to the mixer center axis A. In one example, the injection axis I is generally perpendicular to the mixer center axis A. The large inlet opening 48 of the inlet baffle 44 directs exhaust gas into the exhaust gas inlets 50. The plurality of bypass openings 54 direct exhaust gas to bypass entry into the inlet reactor 52.

In one example, the inlet reactor 52 extends along the injection axis I from the first end 66 at the fluid inlet 70 to the second end 68 that includes a reactor outlet 76. In one example, the bowl portion 72 comprises an end cap that encloses the second end 68 of the inlet reactor 52. The reactor outlet 76 directs a mixture of exhaust gas and injected fluid into the internal cavity 58. The mixture then exits the outlet baffle 46 via a plurality of outlet baffle openings 78 as shown in FIG. 1.

In one example, the reactor outlet 76 comprises a plurality of openings 84 that are circumferentially spaced apart from each other about the injection axis I. The reactor 52 extends along the injection axis I from the first end 66 to the second end 68 that includes the bowl portion 72. This provides an open mixing or swirl chamber 62 within the reactor 52 between the first 66 and second 68 ends.

In one example, the bowl portion 72 comprises a solid base surface 86, e.g. a surface free from openings, that faces the inlet 70 and that includes a peripheral wall 88 extending about a periphery of the solid base surface 86 and extending toward the fluid inlet 70. In one example, the peripheral wall 88 includes the reactor outlet openings 84 through which the mixture of fluid and exhaust gas exits the inlet reactor 52.

In one example, the inlet reactor 52 has a smaller cross-section at the first end 66 than at the second end 68 to form a conical shape. In one example, the doser mount portion 60 at the first end 66 includes a center boss 90 with the fluid inlet 70.

Figure 4:
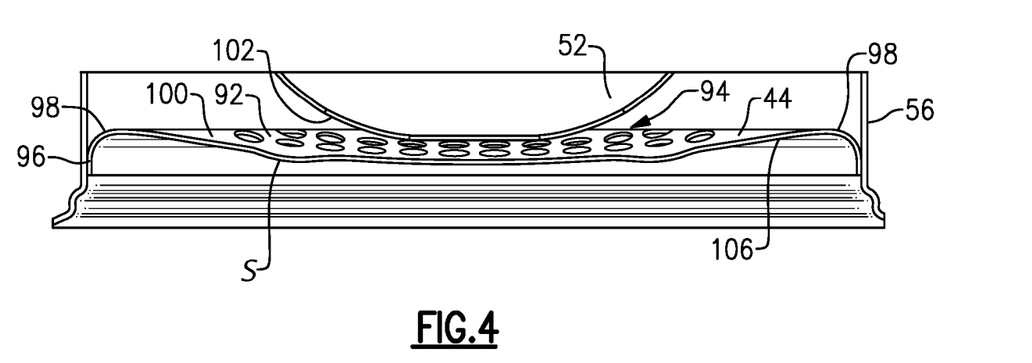
FIG. 4 is a section view of the inlet baffle for the mixer of FIG. 2.

As shown in FIG. 4, the inlet baffle 44 includes a crowned portion 92 that curves away from the reactor 52 to provide for an increased open area 94 within the internal cavity 58 between the inlet baffle 44 and the reactor 52. In one example, the large inlet opening 48 is positioned on one side of the center axis A and the crowned portion 92 is positioned on an opposite side of the center axis A as shown in FIG. 2. As such, the crowned portion 92 does not extend across the entire inlet baffle 44, and instead only extends across a portion of the inlet baffle 44.

In one example, the inlet baffle 44 includes a flange 96 formed about a periphery of the inlet baffle 44. The flange 96 comprises an attachment interface to the mixer shell 56 (FIG. 4). In one example, the flange extends away from the inlet baffle in an upstream direction. The crowned portion 92 comprises a curved surface S (FIG. 6A) that curves from a base 98 of the flange 96 at one peripheral location on the inlet baffle 44 to the base 98 of the flange 96 at an opposite peripheral location on the inlet baffle 44. This curved surface S forms the increased open area 94 within the internal cavity 58 between a downstream surface 100 of the inlet baffle 44 and an outer surface 102 of the reactor 52.

In one example, the inlet baffle 44 includes an embossment 104 formed within a portion of the crowned portion 92. In other words, the embossment 104 does not extend across the entire crown portion 92, and instead only covers a discrete area of the crowned portion 92. In one example, the embossment 104 protrudes outwardly and away from an upstream surface 106 of the crowned portion 92 to further increase the open area 94 within the internal cavity 58 between the inlet baffle 44 at the embossment 104 and the reactor 52.

Figure 5A:
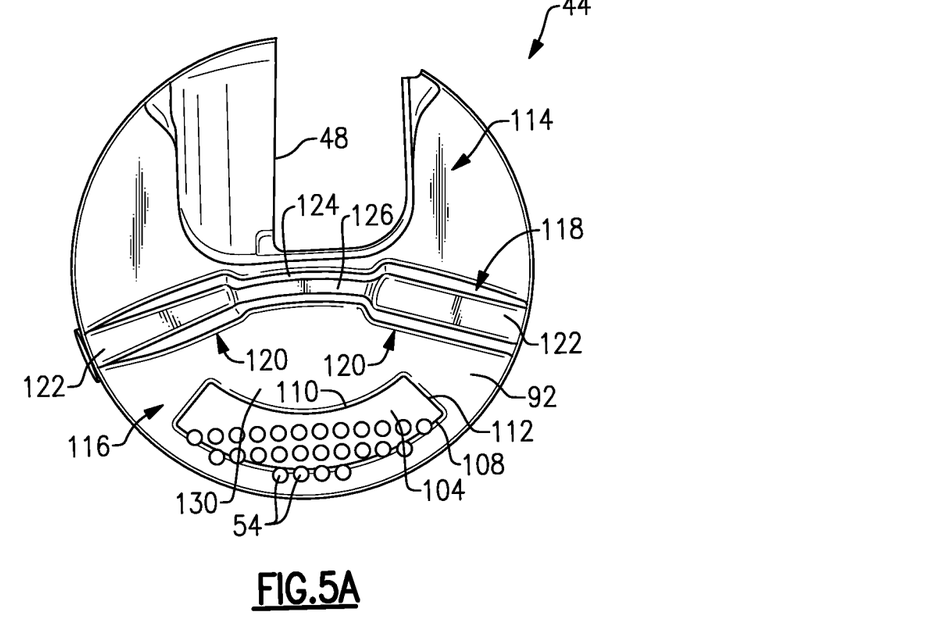
FIG. 5A is an end view of an upstream side of the inlet baffle of FIG. 2.
Figure 5B:
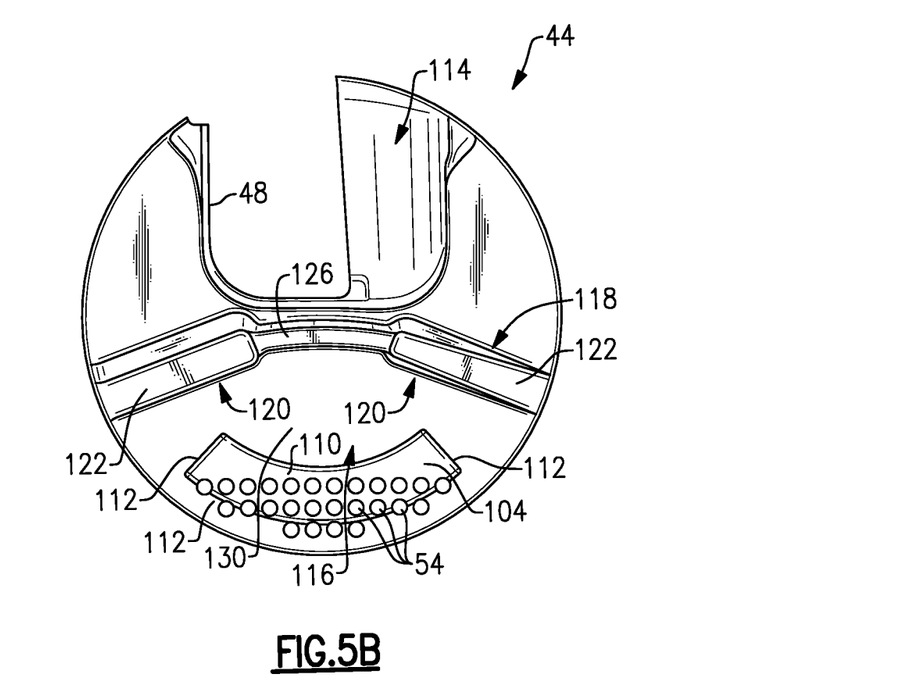
FIG. 5B is an end view of a downstream side of the inlet baffle of FIG. 2.

In one example best shown in FIGS. 5A-5B, the embossment 104 comprises a C-shape that is defined by a radially outward edge 108 and a radially inward edge 110 that are connected by opposing side edges 112. In one example, the embossment 104 extends only partially about the mixer center axis A. In one example, at least some of the plurality of bypass openings 54 are formed within the embossment 104. The embossment 104 and crowned portion 92 provide for increased durability of the inlet baffle 44 to accommodate road and vehicle vibrations.

In one example, the inlet baffle 44 comprises a first portion 114 that includes the large opening 48, a second portion 116 that includes the bypass openings 54, and a third portion 118 that includes at least one sensor mount area 120. The third portion 118 separates the first 114 and second 116 portions from each other. In one example, the crowned portion 92 is formed within the second portion 116. The benefit of this location is that the open area 94 is increased at a location that is at a larger cross-section of the reactor 52. As discussed above, the inlet reactor 52 has a conical shape that has an increasing cross-section in a direction extending toward the reactor outlet 76. By forming the crowned portion 92 at a location that overlaps the outlet openings 84 at the larger cross-section portion of the reactor 52, the inlet baffle 44 can be placed as close a possible to the reactor to keep an overall length of the mixer as short as possible.

In one example, the sensor mount area 120 comprises at least first and second indentations 122 that are each configured to receive a sensor. In one example, the indentations 122 extend in a downstream direction. To further increase the durability, the inlet baffle 44 can also include one or more ribs 124. In one example, the first and second indentations 122 are connected to each other with a rib 124. In one example, the rib 124 includes an additional indentation 126 that also connects to the sensor indentations 122. In one example, the rib indentation 126 is indented to a lesser extend than the sensor indentations as shown in FIG. 5B.

Figures 6A, 6B, 6C:
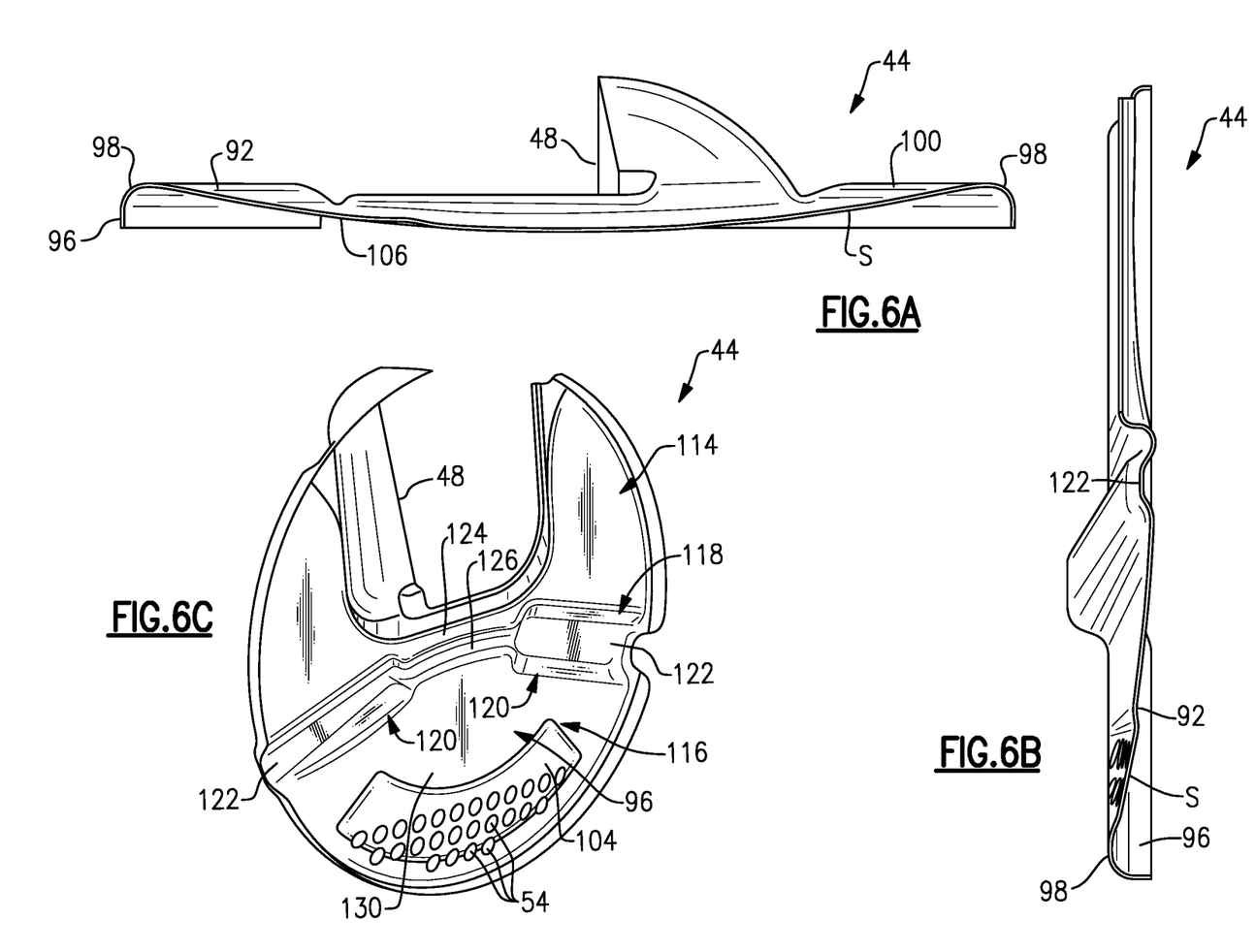
FIG. 6A is a view of one side of the inlet baffle of FIGS. 5A-5B.
FIG. 6B is a view of an opposite side of the inlet baffle of FIGS. 5A-5B.
FIG. 6C is a perspective view of the inlet baffle of FIGS. 5A-5B.

FIG. 6B shows a section view through one of the indentations 122. The crowned portion 92 is on one side of the indentation 122 and the large inlet opening 48 is on an opposite side of the indentation as shown in FIGS. 6A and 6C.

In one example, the inlet baffle 44 includes a solid surface portion 130 free from the plurality of bypass openings 54. The solid surface portion 130 is positioned radially between the embossment 104 and the first and second indentations 122 as shown in FIGS. 5A-5B and FIG. 6C.

A main advantage of strategically locating the strengthening crown portion 92 and embossment 104 on the inlet baffle 44 is that the flow exiting the reactor 52 from the outlet holes 84 closest to the inlet baffle 44 is increased to achieve a more uniform mixture of ammonia in the mixer 30 with the lowest backpressure in the shortest overall mixer length. Initial Computational Fluid Dynamic (CFD) results indicate that the flow from the disclosed inlet baffle 44 can increase by approximately 25% compared to traditional flat baffles. In addition, the crown portion 92 and/or embossment 104 strengthen the inlet baffle 44 by increasing the natural frequency which reduces vibrations.

The subject disclosure forms a crowned portion 92 and/or embossment 104 in the inlet baffle 44 in a specific location and in a desired direction to increase the area for flow to exit the reactor 52 while keeping the inlet baffle 44 as close to the reactor 52 as possible. The crowned portion and/or embossment 104 is added to the inlet baffle 44 in a direction that is away from the reactor 52 and in a location on the inlet baffle that overlaps the increased cross-section portion of the reactor 52 to allow for increased flow to exit the reactor 52 thru the holes 84 located nearest to the inlet baffle 44. This also allows for the inlet baffle 44 to be placed very close to the reactor 52 in order to keep the overall length of the mixer 30 as short and compact as possible.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A mixer assembly for a vehicle exhaust system comprising:
   a mixer shell defining an internal cavity, wherein the mixer shell includes an upstream end configured to receive exhaust gases and a downstream end;
   a reactor positioned within the internal cavity, the reactor having a reactor inlet configured to receive injected fluid and a reactor outlet comprising a plurality of outlet openings that direct a mixture of exhaust gas and injected fluid into the internal cavity;
   an inlet baffle mounted to the upstream end of the mixer shell, wherein the inlet baffle includes at least one opening that directs exhaust gas into at least one exhaust gas inlet to the reactor and a plurality of bypass openings that direct exhaust gas to bypass entry into the reactor, and wherein the inlet baffle includes a crowned portion that curves away from the reactor to provide for an increased open area within the internal cavity between the inlet baffle and the reactor; and
   wherein the inlet baffle includes a flange formed about a periphery of the inlet baffle, the flange comprising an attachment interface to the mixer shell, and wherein the crowned portion comprises a curved surface that curves from a base of the flange at one peripheral location on the inlet baffle to the base of the flange at an opposite peripheral location on the inlet baffle.

2. The mixer assembly according to claim 1, wherein the mixer shell defines a mixer center axis, and wherein the at least one opening is positioned on one side of the mixer center axis and the crowned portion is positioned on an opposite side of the mixer center axis, and wherein the plurality of outlet openings are circumferentially spaced apart from each other about an injection axis that is non-parallel to the mixer center axis.

3. The mixer assembly according to claim 1, including an embossment formed within a portion of the crowned portion, the embossment protruding outwardly and away from an upstream surface of the crowned portion to further increase the open area within the internal cavity between the inlet baffle at the embossment and the reactor.

4. The mixer assembly according to claim 3, wherein the mixer shell defines a mixer center axis, and wherein the embossment comprises a C-shape that is defined by a radially outward edge and a radially inward edge that are connected by opposing side edges.

5. The mixer assembly according to claim 3, wherein at least some of the plurality of bypass openings are formed within the embossment.

6. The mixer assembly according to claim 5, including an outlet baffle mounted to the downstream end of the mixer shell, the outlet baffle including a plurality of mixer outlet openings.

7. The mixer assembly according to claim 1, wherein the reactor extends along an injection axis from a first end at the reactor inlet to a second end that comprises a bowl portion that faces an inner surface of the mixer housing opposite of the doser opening and that includes the plurality of outlet openings.

8. The mixer assembly according to claim 7, wherein the bowl portion comprises an end cap that is spaced apart from the inner surface of the mixer shell and that encloses the second end of the reactor, the end cap comprising a solid base surface that faces the reactor inlet and is free from openings, and wherein the bowl portion further includes a peripheral wall extending about a periphery of the solid base surface and extending toward the reactor inlet, and wherein the plurality of outlet openings are formed in the peripheral wall and are circumferentially spaced apart from each other about the injection axis.

9. A mixer assembly for a vehicle exhaust system comprising:
   a mixer shell defining an internal cavity, wherein the mixer shell includes an upstream end configured to receive exhaust gases and a downstream end;
   a reactor positioned within the internal cavity, the reactor having a reactor inlet configured to receive injected fluid and a reactor outlet that directs a mixture of exhaust gas and injected fluid into the internal cavity; and an inlet baffle mounted to the upstream end of the mixer shell, wherein the inlet baffle includes at least one opening that directs exhaust gas into at least one exhaust gas inlet to the reactor and a plurality of bypass openings that direct exhaust gas to bypass entry into the reactor, and wherein the inlet baffle includes a crowned portion that curves away from the reactor to provide for an increased open area within the internal cavity between the inlet baffle and the reactor, and wherein the inlet baffle comprises a first portion that includes the at least one opening, a second portion that includes the plurality of bypass openings, and a third portion that includes at least one sensor mount area, and wherein the third portion separates the first and second portions from each other, and wherein the crowned portion is formed within the second portion.

10. The mixer assembly according to claim 9, wherein the sensor mount area comprises at least first and second indentations that are each configured to receive a sensor, wherein the indentations extend in a downstream direction.

11. The mixer assembly according to claim 10, wherein the first and second indentations are connected to each other with a rib.

12. The mixer assembly according to claim 10, including an embossment formed within the crowned portion, the embossment protruding outwardly and away from an upstream surface of the crowned portion to further increase the open area within the internal cavity between the inlet baffle at the embossment and the reactor.

13. The mixer assembly according to claim 12, wherein the mixer shell defines a mixer center axis, and wherein the inlet baffle includes a solid surface portion free from the plurality of bypass openings, and wherein the solid surface portion is positioned radially between the embossment and the first and second indentations.

14. The mixer assembly according to claim 12, wherein the embossment comprises a C-shape that extends partially about the mixer center axis.

15. A mixer assembly for a vehicle exhaust system comprising:
a mixer shell having a mixer center axis and defining an internal cavity, wherein the mixer shell includes an upstream end configured to receive exhaust gases and a downstream end, and wherein the mixer shell includes a doser opening configured to receive a doser that injects fluid along an injection axis;
a reactor positioned within the internal cavity, the reactor having a reactor inlet that is aligned with the doser opening to receive injected fluid, at least one exhaust gas inlet to direct exhaust gas into the reactor, and a reactor outlet comprising a plurality of outlet openings that direct a mixture of exhaust gas and fluid into the internal cavity, wherein the plurality of outlet openings are circumferentially spaced apart from each other about the injection axis, wherein the reactor extends along the injection axis from a first end at the reactor inlet to a second end that comprises a bowl portion that faces an inner surface of the mixer shell opposite of the doser opening, and wherein the bowl portion includes the plurality of outlet openings;
an inlet baffle mounted to the upstream end of the mixer shell, wherein the inlet baffle includes at least one opening that directs exhaust gas into the at least one exhaust gas inlet to the reactor and a plurality of bypass openings that direct exhaust gas to bypass entry into the reactor, and wherein the inlet baffle includes a crowned portion that curves away from the reactor to provide for an increased open area within the internal cavity between the inlet baffle and the reactor; and
an outlet baffle mounted to the downstream end of the mixer shell, the outlet baffle including a plurality of mixer outlet openings.

16. The mixer assembly according to claim 15, wherein the bowl portion is spaced apart from the inner surface of the mixer shell.

17. The mixer assembly according to claim 16, wherein the bowl portion comprises an end cap that encloses the second end of the reactor, the end cap comprising a solid base surface that faces the reactor inlet and is free from openings, and wherein the bowl portion further includes a peripheral wall extending about a periphery of the solid base surface and extending toward the reactor inlet, and wherein the plurality of outlet openings are formed in the peripheral wall and are circumferentially spaced apart from each other about the injection axis.

18. A mixer assembly for a vehicle exhaust system comprising:
a mixer shell having a mixer center axis and defining an internal cavity, wherein the mixer shell includes an upstream end configured to receive exhaust gases and a downstream end, and wherein the mixer shell includes a doser opening configured to receive a doser that injects fluid;
a reactor positioned within the internal cavity, the reactor having a reactor inlet that is aligned with the doser opening to receive injected fluid, at least one exhaust gas inlet to direct exhaust gas into the reactor, and a reactor outlet that directs a mixture of exhaust gas and fluid into the internal cavity;
an inlet baffle mounted to the upstream end of the mixer shell, wherein the inlet baffle includes at least one opening that directs exhaust gas into the at least one exhaust gas inlet to the reactor and a plurality of bypass openings that direct exhaust gas to bypass entry into the reactor, and wherein the inlet baffle includes a crowned portion that curves away from the reactor to provide for an increased open area within the internal cavity between the inlet baffle and the reactor, and wherein the inlet baffle comprises a first portion that includes the at least one opening, a second portion that includes the plurality of bypass openings, and a third portion that includes at least one sensor mount area, and wherein the third portion separates the first and second portions from each other, and wherein the crowned portion is formed within the second portion; and
an outlet baffle mounted to the downstream end of the mixer shell, the outlet baffle including a plurality of mixer outlet openings.

19. The mixer assembly according to claim 18, wherein the sensor mount area comprises at least first and second indentations that are each configured to receive a sensor, wherein the indentations extend in a downstream direction.

20. The mixer assembly according to claim 19, wherein the first and second indentations are connected to each other with a rib, and wherein the rib includes an additional indentation.

21. The mixer assembly according to claim 19, including an embossment formed within the crowned portion, the embossment protruding outwardly and away from an upstream surface of the crowned portion to further increase the open area within the internal cavity between the inlet baffle at the embossment and the reactor.

22. The mixer assembly according to claim 21, wherein the inlet baffle includes a solid surface portion free from the plurality of bypass openings, and wherein the solid surface portion is positioned radially between the embossment and the first and second indentations.

23. The mixer assembly according to claim 22, wherein the embossment comprises a C-shape that is defined by a radially outward edge and a radially inward edge that are connected by opposing side edges.

* * * * *